March 25, 1924.

A. B. EINIG 1,487,843

MACHINE FOR MILLING CRANK ECCENTRIC SHAFTS AND THE LIKE

Filed Feb. 26, 1921   3 Sheets-Sheet 1

Inventor
Alvin B. Einig,
By Fay, Oberlin & Fay,
Attorneys

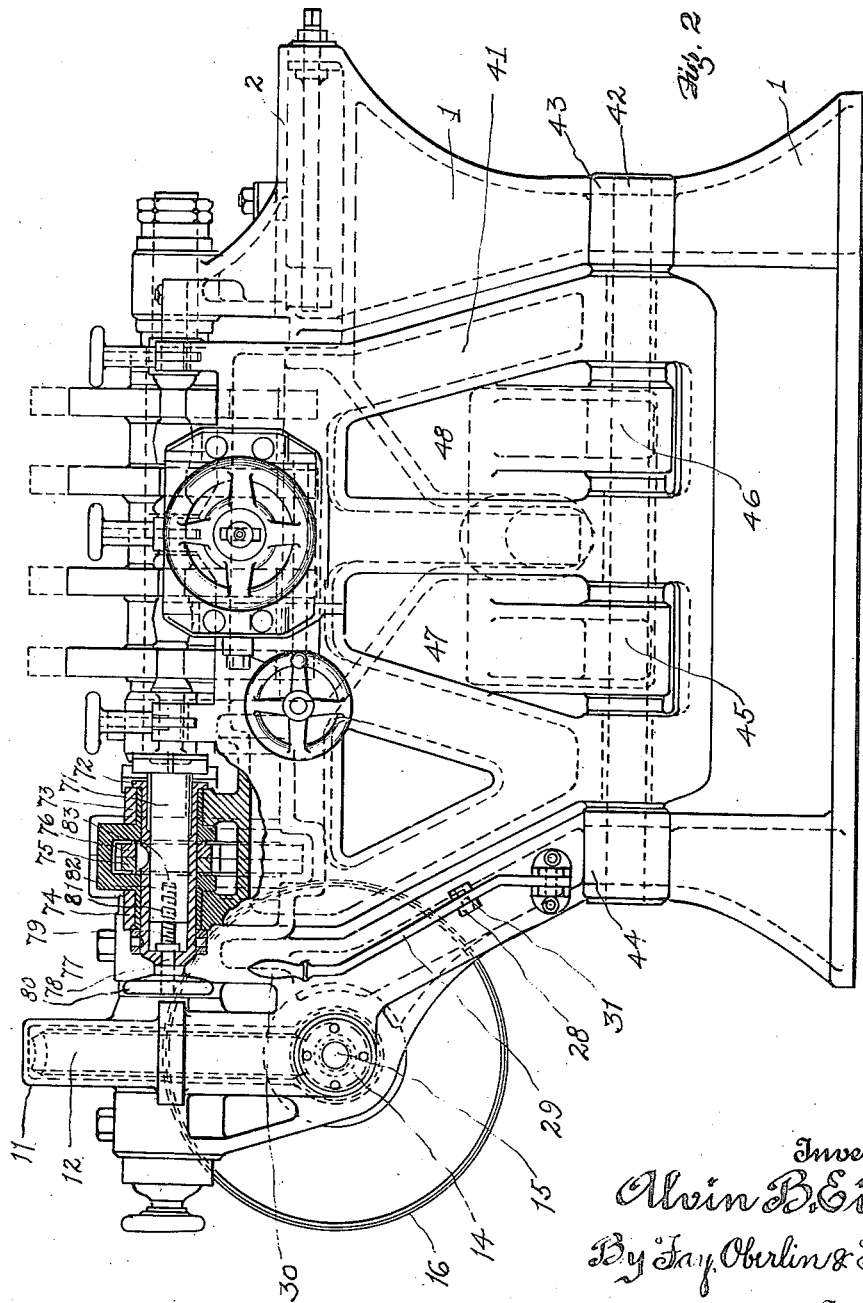

March 25, 1924.
A. B. EINIG
MACHINE FOR MILLING CRANK ECCENTRIC SHAFTS AND THE LIKE
Filed Feb. 26, 1921  3 Sheets-Sheet 3
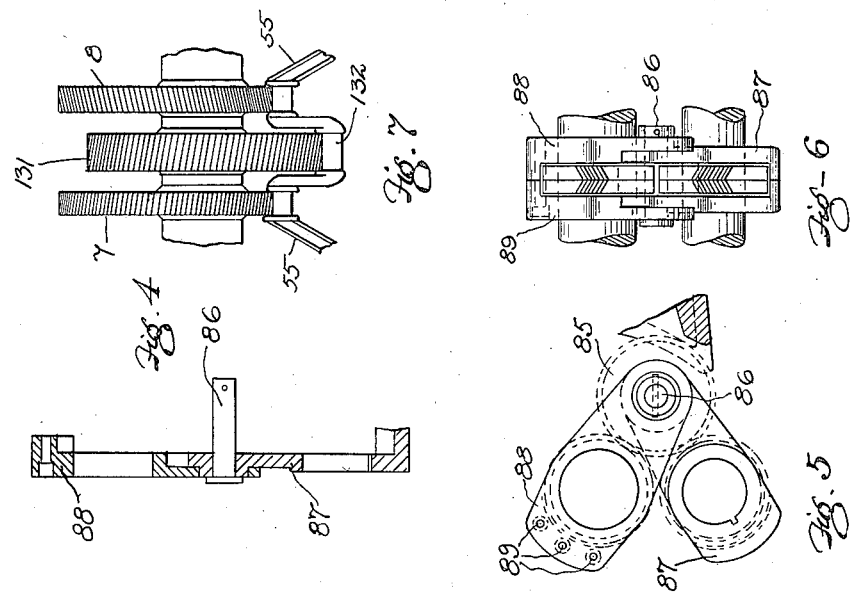
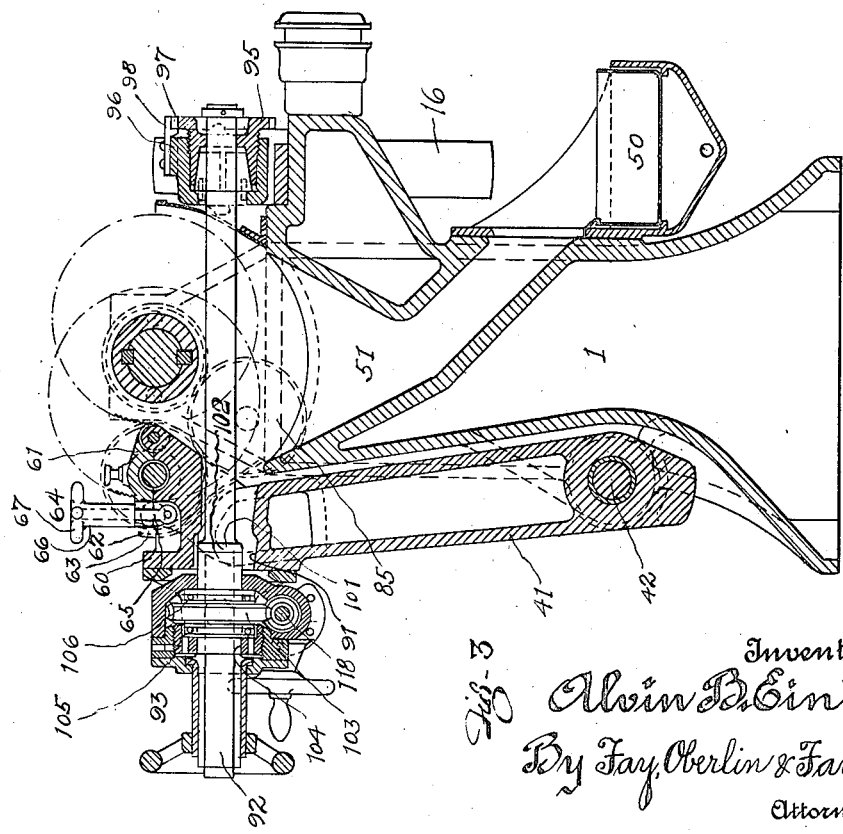
Inventor
Alvin B. Einig,
By Fay, Oberlin & Fay,
Attorneys Patented Mar. 25, 1924.

1,487,843

UNITED STATES PATENT OFFICE.

ALVIN B. EINIG, OF CLEVELAND, OHIO, ASSIGNOR TO THE MOTCH & MERRYWEATHER MACHINERY COMPANY, OF CLEVELAND, OHIO, A CORPORATION OF OHIO.

MACHINE FOR MILLING CRANK ECCENTRIC SHAFTS AND THE LIKE.

Application filed February 26, 1921. Serial No. 447,911.

*To all whom it may concern:*

Be it known that I, ALVIN B. EINIG, a citizen of the United States, and a resident of Cleveland, county of Cuyahoga, and State of Ohio, have invented a new and useful Improvement in Machines for Milling Crank Eccentric Shafts and the like, of which the following is a specification, the principle of the invention being herein explained, and the best mode in which I have contemplated applying that principle, so as to distinguish it from other inventions.

My invention relates to apparatus for milling crank pins or crank shafts of engines and similar parts, and has for its principal object to provide an improved apparatus for more perfectly and expeditiously carying on such work. Another object is to provide a single apparatus for simultaneously carrying on the operations necessary to rough machine or finish machine the entire series of crank pins and line bearings upon a crank shaft at one time, or as many of them as desired. More particularly my invention comprises a means for rotating a shaft or arbor upon which are concentrically or eccentrically mounted one or more milling cutters and in synchronism therewith rotating a crank shaft, the pins or bearings of which are to be singly or simultaneously machined to a certain size and shape. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawings:—

Fig. 2 is a front elevation of the apparatus, one of the bearings being shown in section;

Fig. 3 is a transverse vertical sectional view of the apparatus taken along a central line of the views shown in Figs. 1 and 2;

Figs. 4, 5 and 6 are detail views illustrating my method of supporting the floating gear and the details of the link construction; and Fig. 7 is a fragmentary top plan view showing concentric as well as eccentric milling cutters mounted upon the arbor so that the main or line bearings as well as the crank pin bearings may be simultaneously machined.

Figure 1:
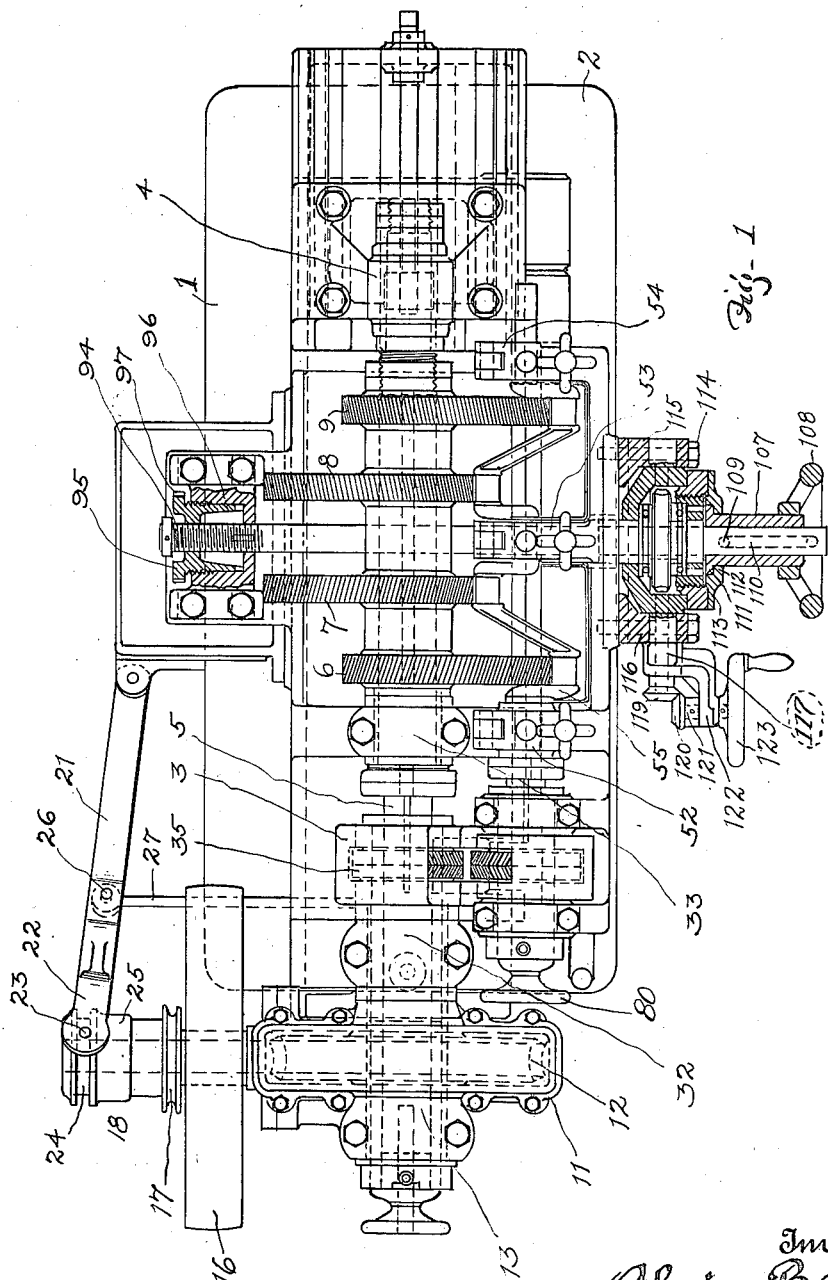
Fig. 1 is a top plan view of my apparatus, certain of the parts being shown in section.

As illustrated in the drawings, the apparatus comprises a main frame 1 of such construction as to provide a horizontal bed portion 2, upon the ends of which are supported, respectively, the bearings 3, 4, for the main shaft 5 upon which are mounted the milling cutter discs 6, 7, 8 and 9. Adjacent the outer portion of the bed member, a driving mechanism 11 is supplied, comprising, as illustrated, a worm wheel 12 mounted upon the main shaft extension 13, a transverse worm 14, a drive shaft 15 therefor, a drive pulley 16 upon said drive shaft, an auxiliary pulley 17 adjacent said drive pulley, and a sliding clutch 18 at the end of said shaft opposite that carrying the worm. The clutch shifting mechanism comprises a lever 21 pivoted at one end to the main frame and having at its other end a fork 22 provided with pins 23 engaging an external groove 24 in a collar 25 mounted upon the movable part of the clutch. At an intermediate point, a pin 26 is provided upon said lever to which is connected a link 27 which passes through an aperture 28 in the frame and is pivotally connected at its outer end with a hand lever 29 pivoted at its lower end on the front of the frame and provided with a hand grip 30 at its upper end and the connection 31 for said link at an intermediate point. In the space between the milling cutters and the worm wheel, a pair of bearings 32, 33, for the main shaft is provided, and between said bearings a gear wheel 35 provided with herringbone gear teeth engages the drive mechanism later to be referred to.

Upon the front of the main frame, an auxiliary frame 41 is provided, which is journaled to said main frame by being mounted at its lower edge upon a shaft 42 held in bearings 43, 44, upon the outer portions of said main frame and a pair of intermediate bearings 45, 46, projecting outwardly from the central portion of said main frame and passing through apertures 47, 48 provided transversely through said auxiliary frame. The forward portion of the main frame is curved inwardly to properly accommodate the auxiliary frame, and the upper central portion of the main frame is provided with a hopper-like chute 51 into which the metallic particles removed by the cutting blades will fall and be carried through a passageway opening upon the rear side of the main frame into any suitable receptacle 50 supplied at that point. The upper edge of the auxiliary frame is provided with a plurality of bearings 52, 53, 54, of a suitable size to engage the main bearings of the crank shaft 55, the pins of which are to be machined. These bearings upon the auxiliary frame are made in two parts, each comprising a lower bearing section 60 formed in said frame and an upper member 61 hinged to the auxiliary frame and provided at its forward edge with a nose portion 62 through which is cut an open-ended slot 63 for the reception of a clamping member 64 comprising a pin 65 screw threaded at its upper end and pivoted to the auxiliary frame at its lower end. An internally screw threaded sleeve 66 with an integral hand wheel 67 is engaged upon the screw threaded portion of the pin. Through the means just described, a crank shaft can be quickly placed in proper position in the auxiliary frame and clamped in operative position between the two sections of the several bearings in a very short period of time. One end of the crank shaft is engaged by a chuck 71, of any preferred design, which operates within a sleeve 72 carried by a pair of aligned journals 73, 74, supported upon the auxiliary frame. These journals are illustrated in section in Fig. 2, which shows the rotatable sleeve with herringbone gear members 75, 76, keyed centrally thereon. The outer end of said sleeve is closed and is provided centrally with a bearing 77 within which is seated the collar section 78 of a rotatable stem 79 provided at its outer end with a hand wheel 80 and at its inner portion with a screw threaded section 81 co-operatively engaging an internally screw threaded channel 82 formed centrally of a sliding block 83 which may be thus moved longitudinally of the sleeve to lock the chuck into engagement with the end of the crank shaft. The herringbone gear of the said sleeve is adapted to engage a floating gear wheel 85 mounted upon a pin 86 journaled in a support formed of a pair of composite link members 87, 88, each formed of two companion sections and held in assembled relation by a series of bolts 89 joining the sections of the outer link 88 (see Figs. 4 to 6). These link members constitute housings for the herringbone gears engaged by the floating gear wheel and each of said members is suitably apertured to fit over the shafts upon which gears are mounted. Centrally of the upper portion of the auxiliary frame, a transverse opening 91 is provided through which extends a shaft 92 carrying on its forward end a feed mechanism 93 whereby the upper end of the auxiliary frame may be moved toward or away from the milling cutters. The inner end of this transverse shaft is provided with a screw threaded portion 94 which engages an internally screw threaded plug 95, which, in turn, is in screw threaded engagement with a block 96 bolted to the rear portion of the main frame. The outer periphery of the plug is provided with a series of notches 97 adapted to be engaged by a finger piece 98 secured to the upper portion of said block, which will thus serve to lock the plug in any desired position. The forward portion of the transverse shaft is provided with an integral collar portion 101 bearing against a sleeve member 102 mounted upon said shaft. Adjacent said sleeve, the transverse shaft carries a worm wheel 103 slidingly keyed thereon and upon the opposite section of the transverse shaft, a second sleeve 104 is provided. Between the worm wheel and the said sleeves, ball bearings 105, 106 are provided to take up the thrust upon said shaft and provide an anti-friction drive for the feed mechanism. The outer end of the transverse shaft is provided with a sleeve member 107 carrying a hand wheel 108 and having a pin 109 mounted transversely thereof, over which is engaged a slot 110 formed transversely of said transverse shaft. The inner end of this sleeve is provided with a flange 111 which engages beneath the edge 112 of an apertured plate 113 forming the front portion of the feed mechanism casing. The main body of the feed mechanism casing is secured by bolts 114 to the front of the auxiliary frame and carries at its lower side a pair of bearings 115, 116, for a transverse shaft 117, a section of which is formed into a worm 118 which operatively engages the worm wheel 103 provided upon the transverse shaft. One end of the shaft carrying the worm is provided with a bevel gear wheel 119 engaging a bevel gear wheel 120 on a shaft 121 at a right angle thereto journaled in a bracket 122 attached to the casing and carrying at its outer end a hand wheel 123 whereby the feed mechanism may be operated to secure an exact adjustment or feeding action of the auxiliary frame and the work carried therein toward the milling cutters. To secure a more rapid adjustment of the work the hand wheel upon the outer end of the main transverse shaft is operated instead of the hand wheel last referred to.

The operation of the device should be apparent from the description of the construction of the apparatus heretofore set forth. Thus the work comprising a crank shaft having its main bearings in substantially finished form is clamped within the journals provided upon the upper edge of the auxiliary frame, care being taken to so position the crank shaft that the crank pin bearings at their farthest limit of inward motion will contact with the eccentrically mounted milling cutter wheels at their point of smallest radius. At the same time the crank pins the greatest distance from the center of the machine will contact with a portion of their respective milling cutters at the points of their greatest radius. When the adjustment just described has been secured the hand wheel 80 at the end of the sleeve 72 journaled in the auxiliary frame, is operated to engage the chuck with the crank shaft thus holding the same in the desired relation to the co-operating parts. The driving mechanism of the apparatus is then caused to operate and the milling cutters will rotate and serve to machine the adjacent portions of the crank pins which will be rotated with the crank shaft one full revolution with each full revolution of the milling cutters. Thus, all the crank pins on the crank shaft will be simultaneously formed and will be of accurately rounded shape. The milling machine may be used in general practice for rough machining, the final finish being through grinding, or finish machining of crank shafts may be carried out on the apparatus, where desired.

Obviously, but a single crank pin or similar eccentric part may be milled, where desired, by using a single eccentric milling cutter. In the modified construction illustrated in the fragmentary plan view shown in Fig. 7, a concentrically mounted milling cutter 131 is secured to the arbor between the eccentrically mounted cutters 7 and 8 and the main or line bearing 132, instead of being supported within a hinged bearing 53, as shown in Fig. 1, is unsupported and is free to be finished by the adjacent concentrically mounted milling cutter. This practice may be readily carried out where the crank shaft is of sufficiently rigid design and structure. Furthermore, by supplying a tail stock and lathe center to hold the end of the crank shaft opposite the chuck and securing to the main arbor a sufficient number of concentrically mounted milling cutters, it is possible to machine all the bearings of a crank shaft, the line bearings and the pin bearings simultaneously.

In this manner, it will be obvious that a great deal of time can be saved in the production of rough or finish machining of this character, as heretofore it has been customary to perform the operations upon only a portion of the crank pins and bearings at a single time and very often a plurality of operations upon each of the pins and bearings was necessary before such machining was completed.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In an apparatus of the class described, the combination of a frame, a shaft extending longitudinally thereof, driving means for rotating said shaft, a milling cutter eccentrically mounted upon said shaft, an auxiliary frame pivoted to the front of said main frame, crank shaft holding elements mounted upon the upper edge of said auxiliary frame, driving means upon said auxiliary frame for engagement with said crank shaft, and feeding means whereby said auxiliary frame may be adjusted with respect to said main frame.

2. In an apparatus of the class described, the combination of a frame, a shaft extending longitudinally thereof, driving means for rotating said shaft, a plurality of milling cutters eccentrically mounted upon said shaft, certain of said cutters being disposed in opposite phases, an auxiliary frame pivoted to the front of said main frame, crank shaft holding elements mounted upon the upper edge of said auxiliary frame, driving means upon said auxiliary frame for engagement with said crank shaft, and feeding means whereby said auxiliary frame may be adjusted with respect to said main frame.

3. In an apparatus of the class described, the combination of a main frame, a shaft extending longitudinally thereof, driving means for rotating said shaft, a plurality of milling cutters eccentrically mounted upon said shaft, an auxiliary frame mounted adjacent said main frame, means for adjustably positioning said auxiliary frame with respect to said main frame, crank shaft engaging members for rotatably supporting a crank shaft upon said auxiliary frame, crank shaft driving means supported upon said auxiliary frame, and means for synchronously driving said crank shaft and the said milling cutter shaft.

4. In a milling machine, a frame, a main shaft, means for rotating said shaft, a plurality of milling cutters mounted eccentrically upon said shaft, certain of said cutters being disposed in opposite phases, work-holding means, and means for rotating the work in said work-holding means so as to present different circumferential portions thereof to the uniform action of said milling cutters.

5. In a milling machine, a frame, a main shaft, means for rotating said shaft, a plurality of milling cutters mounted eccentrically upon said shaft, certain of said cutters being disposed in opposite phases, work-holding means, means for rotating the work in said work-holding means so as to present different circumferential portions thereof to the uniform action of said milling cutters, and means for relatively moving said milling cutters and said work-holding means.

6. In a milling machine, a frame, a main shaft, means for rotating said shaft, a plurality of milling cutters mounted eccentrically upon said shaft, certain of said cutters being disposed in opposite phases, a work-holding frame, means for adjusting said work-holding frame with respect to said milling cutters, means for rotating said work so that different portions thereof in contact with said milling cutters will traverse a path of inverse degree of eccentricity, and a flexible train of gears for driving said work from said main shaft irrespective of the lateral spacing between said parts.

7. In a milling machine, a frame, a longitudinal shaft mounted upon said frame, a plurality of milling cutters eccentrically secured to said shaft, a work-holding frame, a plurality of aligned bearings upon said frame for rotatably supporting the work, means for rotating said shaft and said work in unison and in opposite directions, and means for feeding said work into the path of said milling cutters.

8. In an apparatus of the class described, the combination of a frame, a shaft extending longitudinally thereof, driving means for rotating said shaft, a plurality of milling cutters eccentrically mounted upon said shaft, a plurality of supporting members adjacent said shaft, one of said members being adapted to freely hold one end of a crank shaft, another member being adapted to securely clamp the opposite end of said crank shaft, means for rotating said clamping member, and means for correlating the rotating motion of said milling elements with that of the crank shaft so that the points of contact of said milling cutter will describe an eccentric path about an axis parallel to said longitudinal shaft.

Signed by me, this 21st day of February, 1921.

ALVIN B. EINIG.